UNITED STATES PATENT OFFICE

FRANZ KANHÄUSER, OF KAZNEJOV, NEAR PLZEN, CZECHOSLOVAKIA, ASSIGNOR TO MONTAN-UND INDUSTRIAL-WERKE VORMALS JOH. DAV. STARCK, OF DOLNI RYCHNOV, NEAR FALKNOV, CZECHOSLOVAKIA, A CORPORATION OF CZECHOSLOVAKIA

PROCESS FOR THE PRODUCTION OF CITRIC ACID BY FERMENTATION

No Drawing. Application filed August 31, 1928, Serial No. 303,364, and in Czechoslovakia December 16, 1927.

This invention relates to improvements in the production of citric acid by the fermentation of fermentable carbohydrates by means of mold fungi.

It is well known that certain mold fungi of the group including *Aspergillus*, *Citromyces*, *Mucor*, *Penicillium*, etc., are capable of forming and accumulating rather large amounts of citric acid in sugar solutions containing nutriment. This observation (as to *Citromyces*) is due to Wehmer (1893) who obtained the first patent in this field (German Patent No. 72,957, dated February 20, 1894). Wehmer worked with a variety of *Penicillium*, which was then designated as *Citromyces*. In German Patent No. 91,891, dated April 13, 1897, the Fabriques de produits chimiques de Thann et de Mulhouse described the fermentation of sugar to citric acid by the aid of *Mucor piriformis*. B. Zahorski observed the citric fermentation produced by *Sterigmatocystis nigra*, a variety of *Aspergillus*, which he described in United States Patent No. 1,066,358, dated July 1, 1913. Later investigations have shown that the property of forming citric acid from sugar under certain conditions is a common property of the black varieties of *Aspergillus*, i. e., *Aspergillus niger*, and that the activity of these molds under favorable conditions greatly exceeds those earlier known. Of late this "citric fermentation" has been the subject of many scientific investigations, of which the following recent researches, which also mention or critically consider the results of the earlier work, may be mentioned:

J. N. Currie: "The Citric acid fermentation of Aspergillus niger". The Journal of Biological Chemistry, Vol. XXXI (1917), pages 15–37.

K. Bernhauer: "Ueber die Säurebildung durch Aspergillus niger I–III". Biochemische Zeitschrift, Vol. 172 (1926), pages 296–349.

H. Amelung: "Beiträge zur Säurebildung durch Aspergillus niger". Hoppe-Syeler's Zeitschr. für physiologische Chemie. Vol. 116 (1927), pages 161–209.

From this literature, somewhat the following picture of the present state of knowledge of the citric acid fermentation, may be obtained:

Cane sugar is suitable as a substrate for the fermentation, as also are maltose, invert sugar, glucose and other sugars and sugar alcohols with 3, 5 and 6 carbon atoms. In addition to these carbohydrates are required nutritive salts, such as inorganic nitrogen compounds (ammonium salts or nitrates), and potassium salts, phosphoric acid, sulfur, and magnesium and lime salts, together with adventitious traces of heavy metal salts of stimulating effect.

A rather high importance is ascribed to the nitrogen content of the fermentation medium, although the results of the different investigations are not concordant. In general it is concluded, however, that relatively large amounts of nitrogen in the fermentation medium lead to great mycelium growth and therefore cause the use of large amounts of sugar for mycelium building and result in poor yields of citric acid. Many authors refer particularly to nitrogen-hunger as the cause of high citric acid yields. Currie considered a solution of the following composition in grams per 1000 ccms. to be the most favorable for citric acid fermentation with *Aspergillus niger*:

| | Grams |
|---|---|
| Saccharose | 125 to 150 |
| $NH_4NO_3$ | 2.0 to 2.5 |
| $KH_2PO_4$ | 0.75 to 1.0 |
| $MgSO_4.7H_2O$ | 0.20 to 0.25 | acidified with hydrochloric acid (4 to 5 ccms. of N/5 HCl) to an initial acidity of pH 3.4 to 3.5.

The temperature at which the fermentation takes place varies between 10° and 40° C. according to the mold fungus used.

In addition to the patents already mentioned the following patents are also concerned with the citric acid fermentation:

Austrian Patent No. 101,009 (February 28, 1925, Dr. Josef Szücs) according to which specially selected stocks of suitable molds ferment molasses as a nutrient solution; German Patent No. 426,926 (March 29, 1926, Dr. Richard Falck) which uses solid starch-containing material as fermentation substrate; and English Patents 266,414 and 266,415 (February 28, 1927, Auguste Fernbach, John Lewis Yuil, and Rowntree & Co., Ltd.), according to which solutions of saccharose or other sugars of a high initial acidity obtained by the addition of strong acids, are fermented and it is supposed that thereby sterilization by heat is made unnecessary and a sterile fermentation is made certain or more probable.

As may be seen, the patentees have endeavored to modify the course of the citric acid fermentation into a certain and economical technical process.

In order to attain economically the industrial production of citric acid it is necessary, in addition to choosing a suitable cheap raw material, to so conduct the process that the sugar is converted to citric acid with the highest possible conversion ratio, that citric acid once formed is not further degraded, that the conversion of sugar to citric acid takes place as quickly as possible, that is with a high time yield, and that the production of citric acid is carried out in such industrial equipment that the yield of citric acid per unit of invested capital is as high as possible. To these economic requirements must be added the necessity for certainty and uniformity of the industrial yield. Here the choice and the maintenance of the mold plays with the best fermentative qualities the most important part.

The selection and cultivation of the mold must always be so carried out, with the aid of mycological analyses and mycological culture methods, that the mold attains the highest production capacity under the operating conditions. It has been found that certain pure-bred stocks of *Aspergillus niger* are most suitable for the citric acid fermentation. In the breeding and cultivation of the molds it has been found that it is necessary, in the cultivation on gelatine or agar agar or solid nutrients from which the crop of spores for seeding the technical fermentation is taken, to bring about in a suitable manner occasional fermentation cycles in a reduced extent under the conditions of technical fermentation, and also to introduce growth cycles in which fruits or parts of plants, which contain certain organic acids such as citric and tannic acids and which are also rich in vitamines, are used as culture media. As such culture media lemons, oranges, tomatoes and similar fruits are especially suitable. It has been found that the spores obtained with a cultivation of this kind give an exceptionally pure acid. Furthermore the fermentative capacity of a stock obtained from this mode of cultivation is retained for a long time.

In a thorough study of the citric acid fermentation of sugars it has been determined that it is a process which takes place in the cells of the mold and that oxygen is unconditionally necessary for the reaction. Whether the formation of the citric acid itself is a vital process or a fermentative process is not material to the technical result. It is, however, certain that it is a very complicated process which takes place in pure form and with optimum time yield and optimum conversion of the sugar used only under quite definite conditions.

In the industrial citric acid fermentation, fermentable mashes similar to those used as raw materials for alcoholic fermentation in the production of alcohol, are used as sugar solutions. With respect to the kind of sugar, saccharose and maltose have been found to be the most suitable. In the production of mashes by the saccharification of raw materials containing starch or other polymerized carbohydrates, the type of saccharification process has been found to be very important in the later production of acid. Only quite definite saccharifying methods produce mashes which are of optimum fermentability; here the diastatic capacity of the molds themselves can be used to advantage, particularly with the aid of other known auxiliary agents.

Next to the sugar the nutrient salts, which have already been mentioned, are of importance in the citric acid fermentation. They may be already contained in the industrial sugar-containing mashes or they must be added in suitable amounts. The following observations relate to the proper amounts to be added in order to obtain optimum yields.

The sugar (or other fermentable carbohydrate or carbon-containing compound) occurring in the fermentation solution is used in the first place for the growth of the mold substance itself and secondly as the source of carbon for the formation of citric acid and more or less undesirable byproducts of the citric acid fermentation and thirdly for the respiration, that is, as a source of energy for the vital processes of the mold and possibly for the process of formation of the citric acid. From this point of view it is apparent that the more sugar is utilized for the production of citric acid, that is, for the technical process of the fermentation, the less sugar is utilized for the growth of the cells and for the energy requirements. Now according to the well known laws of growth the cell development will be influenced by the amount of the nutrient material which is minimally present. This influence, however, is to be limited so far that this nutrient material penetrates the cell to a minimum extent. Therefore the course of the fermentation is to be so conducted that the growth and energy requirements are restricted to the necessary minimum. This is effected by utilizing as the regulatable element of growth a component of the fermenting solution which is present to a minimum extent in industrial sugar solutions. Or the industrial sugar solution may be subjected to such a chemical or mechanical pretreatment, that, without injuring the solution, one of the elements of growth, for instance the phosphoric acid content, is reduced to a regulatable minimum. It must be kept in mind that the process of citric acid formation, as well as the process of mould growth, takes place within the cell, so that both the effect of the processes in the fermenting liquid (diffusion in unagitated fermenting solutions and artificial convection in agitated nutrient solutions) on the inner condition of the cells, and the condition of the cell walls (which is a function of the morphological type of the mold and of the method of culture) play a part. In quiet surface fermentation the process of diffusion is dependent on the depth of the layer of fermenting liquid which for economic reasons must be of suitable magnitude. It is apparent from this observation how important is a knowledge of the proper amount of nutrient in semi-continuous or continuous operation of the citric acid fermentation.

The previous statements in the literature pay no particular attention to the qualitative aspect of the nutrients. It has been found that, under otherwise similar conditions, the form of combination of nitrogen which is used to provide nitrogen for nutrition is of very great importance. It has been found that certain organic forms of combination of nitrogen are most suitable since, to all appearances, they enter the cell in a certain favorable relation to the sugar, are there converted into protoplasm with essentially no energy requirement and are also converted to materials (ferments) which favorably effect the formation of citric acid. Such nitrogenous nutrients include above all amino acids and other hydrolytic and degradation products of albumens. They may already be present in certain industrial sugar solutions or they may be added to the solutions in the form of the hydrolysis-products of albumens which may be made by known processes (for example, the hydrolysate of gelatine and the like) or in the form of recovered liquors from previous fermentations. To the solutions which contain organic nitrogen compounds may also be added more or less small amounts of inorganically bound nitrogen in the form of ammonium salts or nitrates or both. The amount and kind of nitrogen compound to be added are determined by the fermentation conditions, particularly by the kind of sugar which is supplied to the cells.

It has further been found that to permit the accumulation of citric acid in order to obtain it in economic concentrations, that is, to convert the sugar as completely as possible into citric acid without any further attack on the latter, it is advantageous to add to the fermenting solution materials which have the property of combining with the citric acid complex or of masking its acid properties. Wehmer and others have already proposed the addition of chalk to the fermentation mixture in order to neutralize the acid. This, however, gives rise to a series of disadvantages (evolution of carbon dioxide, alkaline effect of the hydrolyzed calcium carbonate which leads to the production of ammonia, etc.). These disadvantages are wholly avoided by using for the above purpose organic materials which can either contain nitrogen or be free from nitrogen so that no precipitate is formed. Such materials can be dissolved or colloidally dispersed. They may be already contained in the industrial sugar solutions or they can be added thereto. Among these substances are included, for example, albumens or their degradation products, carbohydrates of high molecular weight which are not fermentable of themselves, and similar substances.

The fermentation substrates produced according to the present invention may be fermented to citric acid by the known process. The mother liquors after the removal of the citric acid may also be returned to the process in the known manner.

In general the present invention comprises improvements in the production of citric acid by the fermentation of fermentable carbohydrates by means of mold fungi, such improvements including the interposition in the culture of the molds of fermentation cycles under conditions corresponding to those of industrial fermentation and of growth cycles on solid vegetable culture media containing organic acids such as citric and tannic acids and also containing vitamines; the control of the nutrient substances in the fermentation medium so that the growth of the molds is restricted to the necessary minimum for the optimum conversion of sugar to citric acid; the addition to the fermentation medium of all or part of the nutrient nitrogen in the form of organic nitrogen compounds, particularly amino acids; and the addition to the fermentation medium of substances which prevent the destruction of the citric acid formed particularly such substances as form with the citric acid complexes of high molecular weight which are unable to readily penetrate the cell of the mold fungi.

The following examples are given for the purpose of indicating the advantages of the present invention, illustrated by Examples 2 and 3, as compared with the known method, illustrated by Example 1:

*Example 1*

150 parts by weight of sugar (saccharose), 2 parts of ammonium nitrate, 1 part of potassium biphosphate and 0, 2 part of sulphate of magnesium had been dissolved in 1000 parts water. The solution was sterilized and filled into a fermenting vat. After cooling down, the solution was inoculated with a fresh selected *Aspergillus niger* not yet cultivated. The fermentation took place at 25° C. under the access of air. After 15 days the fermentation was interrupted and the sour pure mash and the pressed juice from the fungus cover in a hot state was precipitated with hot lime milk and pulverized calcium carbonate and the precipitated calcium citrate was filtered off. As a result a yield of 42 parts calcium citrate, that is 28% of the sugar present, was obtained. In the residue of the fermentation remain 14 parts sugar.

*Example 2*

In this example the same fermenting solution had been used as in Example 1 only with the difference that this solution was inoculated with spores of *Aspergillus niger* which had been cultivated in the manner described above. The fermentation was effected under the same conditions as in Example 1 (the same temperature, depth of the layer, airing and so on). After 15 days, a yield of 70 parts calcium citrate that is 46.6% was obtained, the residue containing 12 parts sugar.

*Example 3*

The fermentable mash contained 1000 ccms. saccharified maize solution (with 15% sugar), 4 gr. nitrogen in the form of hydrolyzed glue solution (the fermentable mash acquiring thereby a large amount of citric acid masking power), 0,4 gr. potassium biphosphate, 0,2 gr. sulphate of magnesium and 1 gr. sulphate of potassium. The fermentable mash was adjusted to a concentration of hydrogen ions of pH=6, sterilized and filled into a fermenting vat. After cooling down, the solution was inoculated with spores of *Aspergillus niger* cultivated on the same fermenting solution with inclusion of cycles of fermentation according to the directions contained in the foregoing description. In this case also the fermentation was carried out in parallel experiments as in Examples 1 and 2 maintaining the same external conditions as stated in said examples. After expiration of 15 days of fermentation at 25° C. a yield of 104 gr. citrate of calcium with a sugar residue of 10 gr. was obtained, this being a yield of 69.3% calcium citrate (with 1 mol. of water of crystallization) based on the sugar used.

The above examples show quite clearly that by means of the cultivation of the fungi as above stated and by an addition of masking materials while otherwise maintaining the same conditions of the fermentation the yield is increased in a very unexpected manner.

It will be, however, understood that the invention is not in any way limited to the above examples.

I claim:

1. A process for the production of citric acid by the fermentation of fermentable carbohydrate compounds by means of mold fungi, which comprises cultivating the mold stock in alternating stages including cultivation in a solid culture medium of the group consisting of gelatine and agar agar, cultivation in liquid culture media under conditions corresponding to industrial fermentation, and cultivation on vegetable culture media containing organic acids and vitamines and thereafter inoculating mashes containing fermentable carbohydrate compounds with said mold stock and subjecting the inoculated mash to fermentation.

2. A process for the production of citric acid according to claim 1, in which, in one of the stages, the mold stock is cultivated on solid vegetable culture media containing organic acids and vitamines.

3. A process for the production of citric acid in accordance with claim 1 in which at least a part of the nutritive nitrogen in the fermentation is added to the mash in the form of organic nitrogen compounds.

4. A process for the production of citric acid in accordance with claim 1 in which at least a part of the nutritive nitrogen in the fermentation is added to the mash in the form of organic amino acids.

5. A process for the production of citric acid in accordance with claim 1 in which at least a part of the nutritive nitrogen in the fermentation is added to the mash in the form of organic nitrogen compounds and in which substances which mask the acid properties of the citric acid are added to the mash.

6. A process for the production of citric acid in accordance with claim 1 in which at least a part of the nutritive nitrogen in the fermentation is added to the mash in the form of organic nitrogen compounds and in which substances which form with the citric acid complexes of high molecular weight which do not readily penetrate the cells are added to the mash.

7. A process for the cultivation of mold fungi for use in the production of citric acid by the fermentation of fermentable carbohydrate compounds which comprises cultivating the mold stock in alternating stages including cultivation in a solid culture medium of the group consisting of gelatine and agar agar, cultivation in liquid culture media under conditions corresponding to industrial fermentation, and cultivation on vegetable culture media containing organic acids and vitamines.

In testimony whereof, I affix my signature.

FRANZ KANHÄUSER.